OSCILLATING FREE PISTON PUMP

Original Filed July 31, 1968 2 Sheets-Sheet 1

OSCILLATING FREE PISTON PUMP

Original Filed July 31, 1968 2 Sheets-Sheet 2

United States Patent Office

Re. 27,740
Reissued Aug. 21, 1973

27,740

OSCILLATING FREE PISTON PUMP

Mark Schuman, 101 G St. SW., Washington, D.C. 20024

Original No. 3,489,335, dated Jan. 13, 1970, Ser. No. 749,130, July 31, 1968. Application for reissue Jan. 12, 1972, Ser. No. 217,347

Int. Cl. F04b *19/24*

U.S. Cl. 417—207 46 Claims

Matter enclosed in heavy brackets [ ] appears in the original patent but forms no part of this reissue specification; matter printed in italics indicates the additions made by reissue.

ABSTRACT OF THE DISCLOSURE

A thermal powered pump formed of a cylinder, containing a free, oscillating piston, and having a heating chamber for providing above the piston, heated, expanding gases to be pumped for moving the piston downwardly to compress the gas located beneath it which, in turn raises piston so that the piston oscillates up and down, and with the pump outlet located above the piston for expelling the gas. A shunt interconnects the cylinder portions above and below the piston for carrying gas to the portion below the piston for maintaining the center of oscillation of the piston with respect to the cylinder.

BACKGROUND OF THE INVENTION

Conventional piston type pumps used for pumping gases, such as air or the like, generally include a cylinder containing a movable piston which is connected to a motor or engine as a power operating means for the pump. In addition, such types of pumps are generally bulky, noisy, and relatively expensive in construction, and cannot operate on continuously applied thermal power.

Thus, this invention is concerned with providing a simply [construction] *constructed,* thermally powered pump mechanism, in the form of a free floating piston [pump] oscillating within a cylinder. Power is supplied by a suitable heating means, such as a continuously operated electrical heating coil or [carbon type] *fossil* fuel heater, which is relatively efficient and inexpensive. The relative size of the pump, as compared to prior pumps, is reduced and its noise of operation, both electrical and audible, is considerably reduced. The improved pump may serve a number of pumping functions, as for example, to provide high pressure gases to a turbine or turbo-generator, etc.

SUMMARY OF INVENTION

Summarizing, the invention herein contemplates oscillating a free piston by means of initially placing it between equal volumes of gas which act like a pair of compression springs to push the piston back and forth between them, but with one spring having an added push on its expansion *and a decreased push during its contraction,* to prevent the oscillation from dying out. Thus, one of the gas volumes is heated *by hot surfaces within the cylinder* and expands to push the piston *away from the hot surfaces, thereby drawing cool gas into the one volume and compressing gas in* [to compress] the other [gas] volume. [which rebounds] *Gas in the other volume acts* like a spring to [return] *reverse* the piston [to expel, and thereby pump the heated gas. The repeated oscillation steps generally comprise supplying heated expanding gas, movement of piston to compress the opposite gas volume, and rebound and expulsion of the heated gas.] *motion to compress the cool and heated gas. A portion of the cool and heated gas is expelled from a substantially closed chamber containing said one volume to provide the output of gas from the pump.*

*Another portion of the cool and heated gas in the one volume is compressed into proximity with the hot surfaces for subsequent expansion to drive the piston again to repeat the cycle.* The supply of heated gas provides the pressure to maintain the oscillation and prevent it from slowing down and stopping. *The cooling of heated gas by a cylinder wall portion variably exposed by the piston provides additional energy to help sustain oscillation and to pump cooler, and therefore more concentrated, gas.* Additional gas is intermittently supplied to the opposite gas volume to maintain the center of oscillation of the piston. The oscillation is initially started by use of an auxillary starting pump which use is discontinued once the pston oscillation stabilizes.

An object of this invention is to drive an oscillating, free piston within a cylinder by means of heated expanding gas applied to one face of the piston and non-heated compressed gas, which is compressed by the piston itself, at the opposite face of the piston, and to expel or pump the heated gas.

Another object is to provide a simple, quiet operating pump construction utilizing a constantly operated heater which [continually, rather than intermittently,] heats the gas, [but] wherein the gas intermittently applies pressure to the piston to cause continued oscillation thereof.

Another object of this invention is to utilize, as the thermal power means for such pump, a temperature differential provided by means of heating and cooling reservoirs, or by means of natural temperature differentials such as the heat of sunlight as compared to ambient temperature or available water temperature or the like.

A further object of this invention is to provide a pump as described above but utilizing a double action operation, which includes a pair of opposed pistons operating oppositely and synchronously to thereby balance out low frequency piston vibrations.

These and other objects and advantages of this invention will become apparent, upon reading the following description, of which the attached drawings form a part.

DETAILED DESCRIPTION

Figure 1:
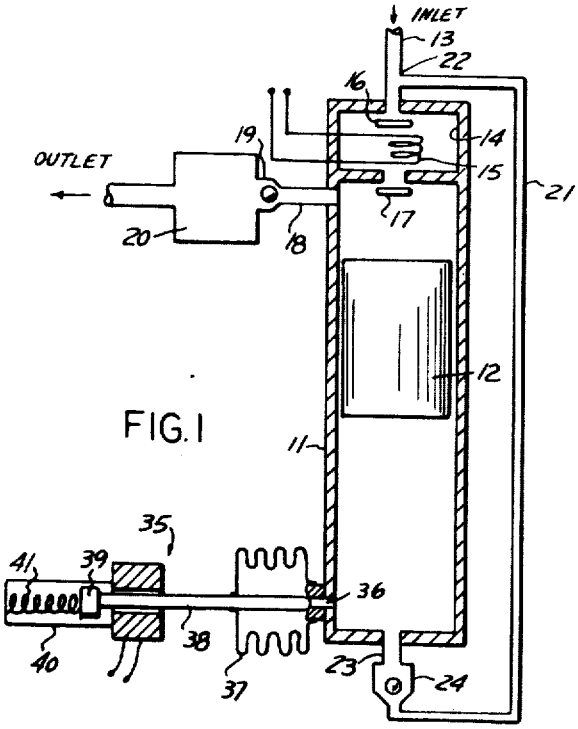
FIG. 1 is a schematic, elevational, cross-sectional view of the oscillating free piston pump herein.

FIG. 1 illustrates a pump 10 formed of a vertically arranged, closed cylinder 11, containing a loosely fitted, free, *integral* piston 12 *having substantially the same cross sectional dimensions throughout its length* adapted to oscillate vertically up and down within the cylinder. The cylinder includes an inlet pipe 13 through which [the] *a compressible fluid, such as a suitable* gas, to be pumped enters the cylinder. *Hence, the upper and lower faces of*

*piston 12 can be considered as a moving wall or portions of first and second variable volume chambers.*

Figure 2:
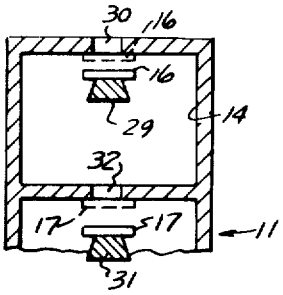
FIG. 2 is an enlarged, cross-sectional schematic view of the upper, heating chamber portion of the cylinder.
Figure 9:
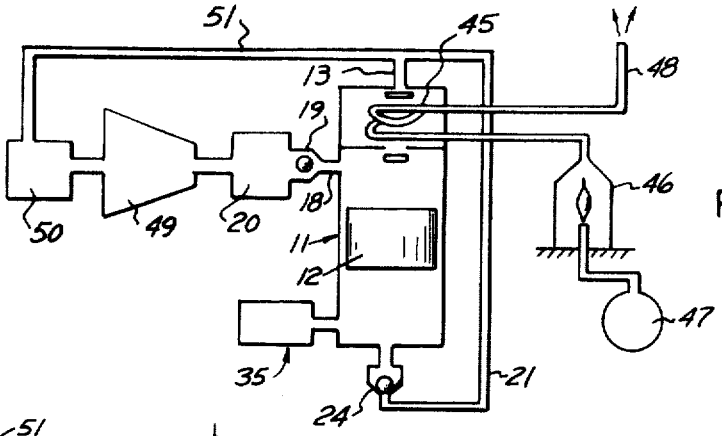
FIG. 9 schematically illustrates the use of the pump in powering a turbo generator, and also illustrates a modified heater.
Figure 10:
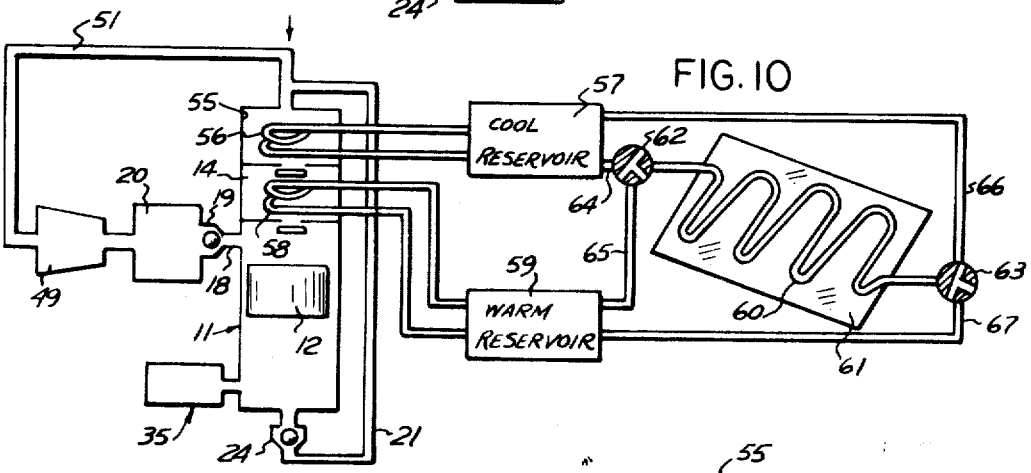
FIG. 10 illustrates a modification wherein a [heat differential] *temperature differential applied to the intake gas* is utilized to provide the thermal power.
Figure 12:
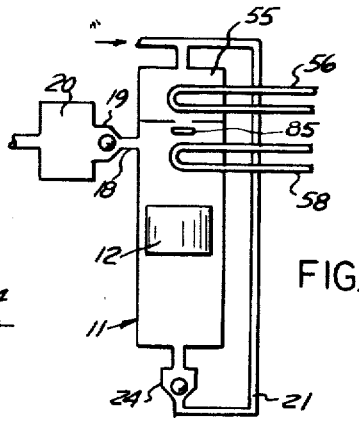
FIG. 12 illustrates another modification similar to that of FIG. 10.

Between the inlet pipe and the body of the cylinder is arranged a heating chamber 14 containing a suitable [heating element] *independent heat source* 15, such as an electrical heating coil powered by an outside electrical source, such as a conventional house circuit. *As specifically illustrated in FIGS. 9, 10 and 12, coil 15, in combination with chamber 14, as specifically illustrated in FIGS. 1 and 2, forms heated fluid passageway means that is relatively wide and has a relatively large volume and smooth walls. Thereby, gas flows readily into the passageway means where it is gradually and continuously heated.*

The inlet to the heating chamber is closed by a valve 16 and the outlet is closed by a valve 17, these being one-way type of valves, [passing the gas only] *polarized to pass gas* in the direction from the inlet towards the main body of the cylinder and closing when necessary to prevent the gas from returning back to the inlet.

A pump outlet pipe 18 is arranged at the upper portion of the cylinder and contains a suitable one-way outlet valve, as for example, a conventional ball check valve 19, which leads into a surge or storage tank 20 for smoothing out the pulsating pumped gas.

A shunt pipe 21 is arranged around the cylinder, with its upper end 22 connected to the inlet pipe 13 and its lower end 23 connected to the interior of the bottom of the cylinder through a one-way inlet valve 24, such as a suitable ball check valve or the like which permits the flow of gas into the bottom of the cylinder through the shunt pipe but not in reverse direction.

Figure 3:
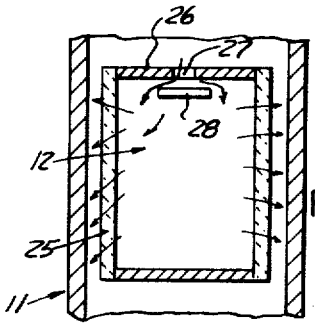
FIG. 3 is an enlarged, fragmentary, elevational view of the piston and a portion of the cylinder.

The piston 12, being loosely fitted within the cylinder, is gas lubricated for substantially frictionless movement. Preferably, the piston is formed of a cylindrically shaped, porous, sintered metal, side wall 25 which is gas pervious (see FIG. 3). The piston is closed by a top cover 26 having a central opening 27 and closed by a suitable one-way valve 28 (shown schematically) so that it will fill with gas on its up stroke while permitting the pressurized gas to continuously leak through the wall 25. This serves to gas lubricate the piston relative to the cylinder wall and to maintain the piston co-axially with the cylinder.

While a variety of one-way valves may be found for the inlet and outlet of the heating chamber, FIG. 2 illustrates one suitable form which comprises wafers 16 and 17 having an inlet stop or limit 29 and an outlet stop or limit 31. The outlet stop provides a greater distance of movement for the wafer 17 than is provided for the wafer 16 so that the wafer 17, in effect, is a delayed acting valve because of its greater required movement and lower restriction of reverse gas flow. The wafers close the inlet opening 30 and the outlet opening 32 of the heating chamber 14. The object here is to provide an outlet valve for the heating chamber which closes at a short time interval after the inlet valve closes *to enable some gas to flow through valve 17 in a direction opposite from the normal flow through valve 17*, for reasons to be explained below. Thus, other forms of valves such as solenoid operated valves or other suitable timed valves may be utilized for this purpose.

Referring to FIG. 1, the pump also includes an auxiliary starter pump 35 for start-up purposes. This comprises an inlet pipe 36 leading from the bottom of the cylinder and opening into a bellows 37 which is connected to a piston rod 38 having a piston 39 arranged within a cylinder 40 containing a compression spring 41. In addition, the rod is surrounded by a conventional solenoid coil 42. The solenoid is arranged to periodically move the piston rod 38 to the left, as referring to FIG. 1, whereas the spring 41 returns the piston rod to the right to thereby pump the bellows. The bellows sucks gas out of the cylinder to lower the piston 12, and pumps gas into the cylinder to raise the piston 12. It is used for a short time to start the normal pump operation.

OPERATION

During normal operation, the piston oscillates upwardly and downwardly, with heated gas entering the cylinder, above the piston, from the heating chamber and with *some of* this gas being pumped out of the cylinder through the outlet 18 during *the upstroke or* the top portion [upstroke] of the piston stroke. FIGS. 4 through 8 schematically show certain of the steps in the operation of the pump. *Some of the gas also oscillates from chamber 14 into cylinder 11 and back into chamber 14 during each cycle of piston oscillation.*

Figure 4:
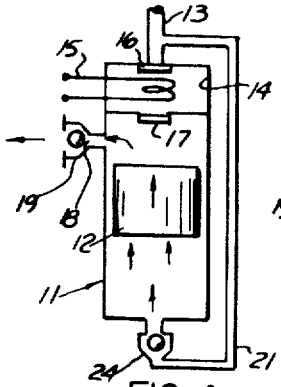
FIGS. 4 through 8 show successive steps in the operation of the pump.

FIG. 4 illustrates the piston travelling upwardly near the top of its upstroke. Here the heating chamber valves 16 and 17 are closed, gas is being expelled through the outlet 18 whose check valve 19 is open. The arrows beneath the piston, within the cylinder, represent the expansion or rebound of gas, located below the piston, which has been previously compressed by the downward movement of the piston.

Figure 5:
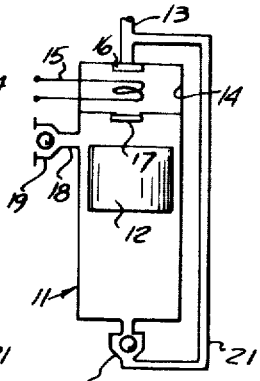

During this time, the heating element 15, which is continuously operated, heats the gas contained within the heating chamber 14, causing the gas pressure to increase [, as shown by the arrows in FIG. 4]. Next, as seen in FIG. 5, gas compressed by the upward movement of the piston, slows such upward movement, stops it, and starts to drive it downwardly. Simultaneously, gas exhausts through outlet 18, until outlet check valve 19 closes due to the higher pressure of the gas contained within the surge tank 20. [In FIG. 5, the valve 16 is shown in its open position.]

In addition, a small amount of gas, as needed, may enter into the bottom of the cylinder through the shunt pipe 21, whose check valve 24 is open so that pressure below the piston does not drop below the inlet pressure. Where the gas being pumped is atmospheric air, the shunt pipe may be omitted and the check valve simply opened to atmosphere, so that, in effect, there is still a shunt.

Figure 6:
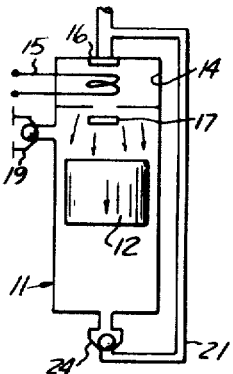

In FIG. 6, the exhaust check valve 19 is closed, and the pressure of the gas in the heating chamber 14 causes inlet valve 17 to open to release heated gas into the cylinder, which gas expands and drives the piston down.

Figure 7:
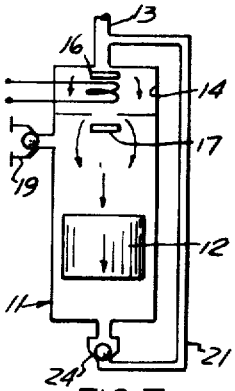
Figure 8:
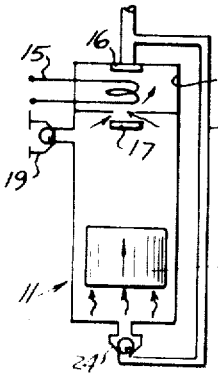

As the piston moves further down, reducing the pressure within the heating chamber to below inlet 13 pressure, the heating chamber inlet valve 16 also opens to admit more gas through the inlet 13 (see FIG. 7). The downward movement of the piston not only permits the cylinder portion above the piston to become filled with the incoming gas, but also compresses the gas located within the cylinder below the piston. Hence, at the lowermost part of the stroke downwardly, the compressed gas beneath the piston reaches its point of maximum compression where it and the piston tend to rebound as a result of this pressure exceeding the pressure above the piston. *Thereby, at the lowermost part of the downward stroke, the compressed gas becomes a pneumatic spring that causes rebound of the piston toward heating chamber 14.* At that point, as shown in FIG. 8, the piston again starts upwardly, compressing the gas above it, and expelling a portion of the gas into the heating chamber 14 through the valve 17 which remains open slightly longer than does the upper valve 16 to insure closing of the valve 16 and to accumulate additional gas within the heating chamber for *greater power and* higher efficiency. *Cooling of heated gas by the exposed cylinder walls just above the piston, i.e., the portion of the cylinder walls uncovered by the piston, decreases the pressure on the piston during its upstroke, thereby helping to sustain the oscillation.* As the piston rises towards the top of the stroke, the pressure above it exceeds the surge tank pressure and gas is expelled out the outlet 18. The cycle is then repeated as shown beginning with FIG. 4.

In this manner, the piston rapidly oscillates upwardly and downwardly, pumping out a pulsating discharge into the surge tank 20 and relying upon the continuously applied heat energy *and the natural cooling of the cylinder*

*walls* to provide it with the [expanding gases] *thermal power* necessary for operation. *Since there are substantially no thermal transfer surfaces between the heating chamber 14 and the walls of cylinder 11, fluid flow between the heating means and the cooling means is substantially adiabatic. It is also seen that the flow of primarily cool fluid into the heating chamber 14 is a direct result of the change in chamber pressure, which in turn is directly caused by the volume displacement of the oscillating piston 12.*

Before the piston stabilizes and oscillates as described above, at the outlet of its operation, it is necessary to start at the regular oscillation by means of starter 35. In essence, its bellows 37 alternately pumps and draws an amount of gas into and from the cylinder, beneath the piston, at approximately the natural frequency of the oscillation of the piston. Thus, the solenoid is properly timed to move the rod 38 with the bellows at such frequency. The starter is used until such time as the piston oscillation stabilizes, at which time the starter is turned off. This may amount to a few minutes of operation.

MODIFICATION

FIG. 9

FIG. 9 illustrates a modification wherein the heating coil is in the form of a pipe 45 opening into a suitable fossil *fuel* type heater 46, such as a natural gas burner type heater, connected in turn to a tank 47 of fuel gas. Other types of suitable heaters may be used, such as a petroleum heater, coal burner or the like. The heated gas from the heater 46 passes through the coil 45 and then out through the end 48 into a discharge stack. *Coiled heating pipe 45 and the walls of chamber 14 form heated passageway means for gas in chamber 14.*

FIG. 9 also illustrates the pump as being used to power a conventional turbo-generator 49 which generates electricity. The gas pumped through the generator 49 is cooled in a cooling tank 50 or by other cooling means such as fins surrounding the return pipe 51 which returns the gas back to the inlet 13. This illustrates a closed circuit gas movement wherein the gas is recirculated.

In the embodiment illustrated in FIG. 1, the gas may be air, in which case no recirculation is contemplated, or it may be a gas of more value which requires recirculation and hence, interconnection between the inlet and outlet pipes ultimately.

The operation of the pump shown in FIG. 9 is otherwise the same as that described above.

FIG. 10

FIG. 10 illustrates a further modification which contemplates utilizing [a temperature differential in providing the heat to] *warm and cool reservoirs in thermal transfer relationship with the intake gas for providing the temperature difference required to operate* the pump. [As an example, above] *Above* the heating chamber 14 is located a cooling chamber 55 having a cooling coil 56 for first cooling the inlet gases, which are then heated by the heating coil *58* located within the heating chamber. [Once the gas is heated and enters the cylinders, the] *The* operation is *otherwise* the same as described above, with the gas powering a turbo-generator 49 and then being recirculated back to the cylinder through the return pipe 51.

The coil 56 may be cooled by the use of a cold water reservoir 57, with the heated coil 58 farmed by a warm reservoir *59*. The cooled reservoir may be an available water supply, such as a natural well, pond, etc.

It is contemplated that this arrangement may utilize ambient temperatures and sun heat to operate around the clock. To this end, a heat exchanger coil 60 is provided and mounted upon a panel 61 which could be arranged upon a rooftop or out of doors where it is exposed to the sun. The coil is connected through valve 62 to a cool reservoir inlet pipe 64 and a warm reservoir inlet pipe 65 and through a valve 63 to a cool reservoir outlet pipe 66 and a warm reservoir outlet pipe 67. In this case, the reservoirs may be large water tanks. Thus, during the day, when the sun is available to provide heat, by adjusting the valves 62 and 63, the liquid in the warm reservoir may be heated and the liquid in the cool reservoir simply left at ambient temperature, preferably in a cool, shaded place. In the evening, when the sun is no longer available, the valve 62 and 63 may be reversed to utilize radiant cooling and the cold ambient temperature to cool the cool reservoir further below the liquid in the warm reservoir.

In this manner, the net result is that the gas entering through inlet 13 is first cooled by the coil 56 and is then heated by the coil 58 to provide for greater pressure build-up and subsequent expansion. Thus, the differential of temperature, provided as described above or in other equivalent ways, serves as a means for operating the pump.

FIG. 11

Figure 11:
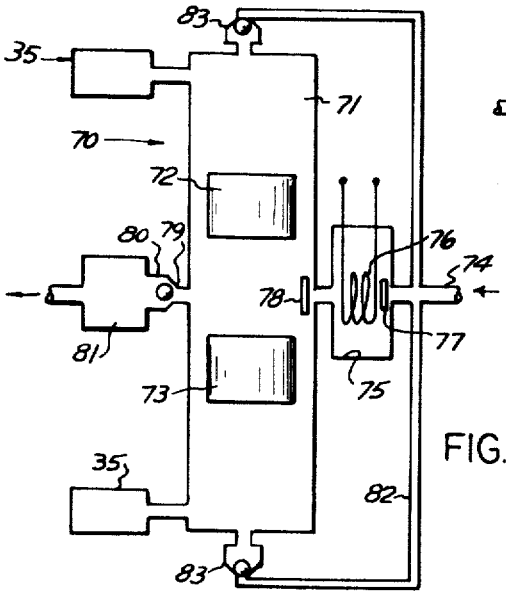
FIG. 11 illustrates a further modification showing a double acting pump utilizing a pair of opposed free pistons.

FIG. 11 illustrates a modification in the form of a double ended or double acting pump 70 comprising a cylinder 71 containing a pair of free pistons 72 and 73 *positioned to oscillate along a common axis.* The inlet 74 delivers the gas to the heating chamber 75 which contains the heating coil 76 and has an inlet valve 77 and an outlet valve 78 located between the two pistons. Also, the pump outlet pipe 79 is located between the two pistons and discharges through a one-way valve 80 into the surge tank 81.

The opposite ends of the cylinder are connected to the inlet 74 by means of a shunt pipe 82 containing one-way valves 83 at each end of the cylinder.

For purposes of starting the pump, a pair of starters 35 are provided at each end of the cylinder, although one starter might be used with pipes leading to each of the opposite ends.

The operation of this pump is the same as described before except here, the two pistons move oppositely and synchronously.

FIG. 12

FIG. 12 illustrates a modification similar to that of FIG. 10, with the exception that no separate heating chamber is provided below cooling chamber 55 which contains the cooling coil 56 and is closed at its bottom by a one-way valve 85. Here the heating coil is exposed above the piston. [While heating the gas in the up-stroke is relatively inefficient, this] *This* construction is simpler and may have certain low efficiency applications.

Having fully described an operative embodiment of this invention, I now claim:

[1. An oscillating free piston pump, for pumping gas, comprising a closed vertical cylinder containing a free piston loosely fitted therein for vertical oscillation;

a gas inlet and a gas outlet located above the piston, the inlet being also connected by a shunt pipe through a shunt one-way valve to the opposite end of the cylinder for permitting gas to flow into the cylinder below the piston;

a heating chamber connected between said inlet and the cylinder above the piston for heating incoming gas before entry into the cylinder and having a one-way chamber inlet and chamber outlet valves for controlling gas flow only towards the cylinder and for closing upon upward movement of the piston, with the chamber outlet valve being formed to close shortly after the chamber inlet valve closes;

said gas outlet having a one-way outlet valve for passing the pumped gas only out of the cylinder;

whereby downward movement of the piston is effected by expansion of the heated gases entering the cylinder from the heating chamber and by gas compressed above the piston applying a force to the top of the piston, and upwards movement of the piston is effected solely by compression and rebound of the compressed gas below the piston applying an upwards force upon the bottom of the piston.]

[2. A construction as defined in claim 1, and including a starter pump connected to the cylinder below the piston, said starter pump having means for regularly and periodically pumping gas into and out of the cylinder below the piston at the natural frequency of oscillation of the piston for a period of time sufficient to stabilize the normal oscillation of the piston within the cylinder.]

[3. A construction as defined in claim 1, and including a heater element contained within said heater chamber and constantly operated to maintain a continuous heat input into said chamber by an outside source of heat energy.]

[4. A construction as defined in claim 1, and including a cooling chamber, containing means for cooling gases passed therethrough, connected between the gas inlet and heating chamber for reducing the temperature of and contracting the specific volume of the gas prior to entry of the inlet gas into said heating chamber.]

[5. A construction as defined in claim 1, and including a second free piston located in the cylinder spaced above the first piston and the gas inlet and outlet, with the upper end of the cylinder also connected to the gas inlet by a shunt pipe containing a one-way shunt valve for controlling gas flow only into the upper end of the piston above the second piston;

whereby the two pistons move respectively oppositely and synchronously upon entry of heated gas into the cylinder between them and upon rebound of the compressed gas when the pistons reach near their respective opposite cylinder ends.]

[6. An oscillating free piston pump for pumping a gas, comprising a closed cylinder containing a free piston loosely fitted therein for oscillation along the axis of the cylinder;

said piston dividing the cylinder into a pumping chamber closed by an end of the piston and compression chamber closed by the opposite end of the piston;

a gas inlet and a gas outlet located in said pumping chamber with a continuously operating heater located between said inlet and outlet, and including a one-way inlet valve at said inlet and a one-way exit valve at said outlet;

means for initially starting the piston to oscillate within said chamber at a predetermined frequency;

and means for connecting the compression chamber to inlet gas pressure at about the time that the piston reaches the end of its stroke towards the inlet;

wherein movement by the piston away from the inlet compresses gas contained in the compression chamber until maximum compression is reached and the compressed gas rebounds and acts as the sole means for driving the piston towards the inlet for expelling gas out through the outlet and simultaneously compressing gas in the pumping chamber, and movement away from the inlet is effected by a combination of expanding heated gas entering the pumping chamber and compressed gas resulting from piston movement towards the inlet.]

*7. An oscillating device comprising a chamber substantially closed during at least a portion of the oscillation cycle, said chamber having a solid peripheral wall portion oscillating so as to vary the volume of the chamber, a portion of the chamber being shaped to form fluid passageway means, said oscillating portion configured to decrease and increase the volume of the chamber as it oscillates toward and away from the passageway means, means for independently heating the passageway means so as to heat fluid in the passageway means to increase the expansion of fluid out of the passageway means and augment the pressure of fluid in the chamber as the wall portion is moving away from the passageway means to drive the wall portion away from the passageway means to increase the chamber volume, the peripheral wall portion moving away from the passageway means as the chamber volume is increasing to increase the effective exposure area of a cool surface to heated fluid within the chamber, the wall portion being stopped during each cycle at a position remote from the passageway means, means for rebounding and driving the wall portion toward the passageway means after the wall portion has stopped, said last named means including cooling of the fluid in the chamber, said fluid in the chamber being cooled primarily by the increased exposure which causes contraction of the fluid tending to lessen the pressure of the fluid in the chamber as the wall portion is rebounding toward the passageway means, the movement of the wall portion toward the passageway means inducing a flow of the cooled fluid into the passageway means, the decrease in chamber volume caused by movement of the wall portion as it is being driven toward the passageway means being the primary and direct means for producing pressure variations that primarily and directly induce the flow of the cooled fluid into the passageway means.*

*8. The device of claim 7 further including means for drawing cool fluid into the chamber during a portion of the cycle such that heating of the drawn fluid in the passageway means helps sustain the oscillation.*

*9. The device of claim 7 wherein fluid expands as it flows from the passageway means toward the cool surface as the pressure in the chamber is decreasing from maximum.*

*10. The device of claim 7 wherein fluid flowing from the cool surface toward the passageways contracts as the pressure increases from minimum.*

*11. The device of claim 7 wherein fluid flow between the passageway means and the cool surface is primarily adiabatic.*

*12. The device of claim 7 wherein the oscillating wall portion is a piston.*

*13. The device of claim 7 wherein the oscillating wall portion is a free piston, and wherein the means for rebounding includes a rebound chamber for reversing the direction of piston motion, and means for positioning the center of piston oscillation.*

*14. The device of claim 13 further including means for drawing cool fluid into the chamber during a portion of the cycle.*

*15. The device of claim 14 wherein the means for drawing includes a check valve passing fluid only into the chamber from a source outside of the chamber.*

*16. The device of claim 14 further including means for exhausting fluid from the chamber during a portion of the cycle.*

*17. The device of claim 13 further including means for restricting, during a portion of the cycle, the flow of fluid into proximity with the heated passageway means from another part of the chamber.*

*18. The devcice of claim 13 wherein the free piston is of substantially integral construction.*

*19. The device of claim 13 wherein the free piston has substantially the same cross sectional dimensions throughout its length.*

*20. The device of claim 13 wherein the means for positioning includes: means for connecting the substantially closed chamber to a fluid reservoir while the volume of the substantially closed chamber has values in a first given range and means for connecting the rebound chamber to a fluid reservoir while the volume of the rebound chamber has values in a second given range.*

*21. The device of claim 13 wherein the means for positioning includes a check valve in each of the substantially closed chambers and the rebound chamber, said valve being polarized to pass fluid from a common fluid reservoir into the respective chamber.*

*22. The device of claim 13 further including a starter pump for producing a varying fluid pressure on the free piston for initiating the oscillation.*

*23. The device of claim 13 wherein the rebound chamber contains compressible fluid which acts as a pneumatic compression spring to reverse the direction of piston motion.*

*24. The device of claim 7 wherein the chamber includes a plurality of solid peripheral oscillating wall portions each of which is connected in fluid flow relationship with the heated passageway means so that each wall portion substantially simultaneously moves toward and recedes from the heated passageway means in synchronism in response to heating and cooling of fluid in the chamber.*

*25. An oscillating device comprising a chamber substantially closed during at least a portion of the oscillation cycle, said chamber having a plurality of peripheral wall portions oscillating so as to vary the volume of the chamber, a portion of the chamber being shaped to form fluid passageway means and connected in fluid flow relationship with said wall portions, said oscillating portions oscillating in synchronism with each other so that they substantially simultaneously move toward and recede from the passageway means and being configured to decrease and increase the volume of the chamber as they oscillate toward and away from the passageway means, means for independently heating the passageway means so as to heat fluid in the passageway means to increase the expansion of fluid out of the passageway means and augment the pressure of fluid in the chamber as the wall portions are moving away from the passageway means to drive the wall portions away from the passageway means to increase the chamber volume, the wall portions being stopped during each cycle at positions remote from the passageway means, means for rebounding and driving the wall portions toward the passageway means after the wall portions have stopped, said last named means including cooling of the fluid in the chamber as the wall portions are rebounding and being driven toward the passageway means, said cooling of the fluid tending to lessen the pressure of the fluid in the chamber as the wall portions are rebounding toward the passageway means, the movement of the wall portions toward the passageway means inducing a flow of the cooled fluid into the passageway means, the decrease in chamber volume caused by movement of the wall portions as they are being driven toward the passageway means being the primary and direct means for producing pressure variations that primarily and directly induce the flow of the cooled fluid into the passageway means.*

*26. The device of claim 25 wherein each of the peripheral oscillating wall portions is solid.*

*27. The device of claim 25 wherein each of the oscillating peripheral wall portions comprises a piston, said pistons being paired and positioned to oscillate along a common axis.*

*28. The device of claim 25 wherein each of the oscillating wall portions is a free piston, and a rebound chamber for each piston to reverse its direction.*

*29. The device of claim 28 further including means for controlling the center of oscillation of each of said pistons.*

*30. The device of claim 28 wherein the means for controlling the center of oscillation includes valve means for controlling the relative pressures of fluid in the chamber and in each rebound chamber.*

*31. The device of claim 28 wherein the free pistons are paired such that the paired pistons are positioned to oscillate along a common axis.*

*32. The device of claim 28 wherein each of the free pistons is of substantially integral construction.*

*33. The device of claim 28 wherein each piston has substantially the same cross sectional dimensions throughout its length.*

*34. The device of claim 25 wherein the heated passageway means is connected to a central point between said wall portions.*

*35. The device of claim 25 wherein the movement of the peripheral wall portions away from the passageway means as the chamber volume is increasing, increases the effective exposure area of cool surfaces to heated fluid within the chamber, and the means for rebounding and driving includes cooling of the fluid in the chamber primarily by the increased exposure of the cool surfaces which causes contraction of the fluid and the tendency to lessen the pressure of the fluid in the chamber.*

*36. The device of claim 35 wherein each of the oscillating wall portions is a free piston, and wherein the means for rebounding includes a rebound chamber for reversing the direction of motion of each piston, and means for positioning the center of oscillation of each piston.*

*37. An oscillatory device comprising a chamber substantially closed during at least a portion of the oscillation cycle, said chamber including a peripheral oscillating wall portion, a portion of said chamber being shaped to form fluid passageway means, means for independently heating the passageway means, a source of cool fluid outside of the closed chamber, means for injecting the cool fluid into the chamber during the cycle such that cool fluid is heated and expands out of the passageway means as the wall portion is moving away from the passageway means and the wall portion is driven by the expanding fluid away from the passageway means to increase the chamber volume, the wall portion being stopped at a position remote from the passageway means, and means for rebounding and driving the wall portion toward the passageway means after the wall portion has stopped.*

*38. The device of claim 37 wherein the peripheral wall portion moves away from the passageway means as the chamber volume is increasing to increase the effective exposure area of a cool surface to heated fluid within the chamber, the means for driving the wall portion toward the passageway means including cooling of fluid in the chamber, said fluid in the chamber being cooled primarily by the increased exposure which causes contraction of the fluid tending to lessen the pressure of the fluid in the chamber as the wall portion is rebounding toward the passageway means, the movement of the wall portion toward the passageway means inducing a flow of the cooled fluid into the passageway means, the decrease in chamber volume caused by movement of the wall portion as it is being driven toward the passageway means being the primary and direct means for producing pressure variations that primarily and directly induce the flow of the cooled fluid into the passageway means.*

*39. The device of claim 37 wherein the oscillating wall portion is a piston.*

*40. The device of claim 37 wherein the oscillating wall portion is a free piston, and wherein the means for rebounding includes a rebound chamber for reversing the direction of piston motion, and means for positioning the center of piston oscillation.*

*41. The device of claim 40 wherein the free piston is of substantially integral construction.*

*42. The device of claim 40 wherein the free piston has substantially the same cross sectional dimensions throughout its length.*

*43. The device of claim 40 wherein the means for positioning includes: means for connecting the substantially closed chamber to a fluid reservoir while the volume of the substantially closed chamber has values in a first given range and means for connecting the rebound chamber to a fluid reservoir while the volume of the rebound chamber has values in a second given range.*

*44. The device of claim 37 wherein the oscillating portion is solid.*

*45. The device of claim 24 wherein each oscillating wall portion is a free piston, and wherein the means for rebounding includes a rebound chamber for reversing the direction of motion of each piston, and means for positioning the center of oscillation of each piston.*

*46. In combination, a cylinder containing compressible fluid, a free solid piston in the cylinder, said piston being*

*of substantially integral construction and oscillating between first and second variable volume chambers having faces formed by first and second ends of the piston, means for sustaining oscillation of the piston, said sustaining means including: means for cooling fluid flowing into proximity with the face of the first chamber, means for independently heating a portion of said first chamber, said fluid flowing primarily adiabatically between the cooling means and the heating means.*

*47. The combination of claim 46 further including bypass means for positioning the center of oscillation of the free piston.*

*48. The device of claim 46 wherein fluid expands as it flows from the heated portion of a chamber towards the cooled portion as the pressure in the chamber is decreasing.*

*49. The device of claim 46 wherein fluid contracts as it flows from the cooled portion of a chamber towards the heated portion of the chamber and as the pressure in the chamber is increasing.*

*50. The device of claim 46 wherein the piston shape is substantially a cylinder having substantially the same cross sectional dimensions throughout the piston length.*

*51. The device of claim 46 further including means for reversing the piston including a pneumatic spring of compressed fluid in each of said chambers.*

*52. In combination, a plurality of free pistons of substantially integral construction, a plurality of cylinders, each of said pistons oscillating in one of said clinders between two variable volume chambers, means for connecting together in a fluid flow relationship one chamber of each cylinder, means for cooling fluid flowing into at least one of the connected chambers, fluid passageway means connected in a fluid flow relationship with the connecting means, independent means for heating said passageway means, and means including the connecting means, the heating means, and the cooling means for sustaining synchronized oscillation of the pistons.*

References Cited

The following references, cited by the Examiner, are of record in the patented file of this patent or the original patent.

UNITED STATES PATENTS

| | | | |
|---|---|---|---|
| 3,597,766 | 8/1971 | Buck | 60—24 |
| 3,604,821 | 9/1971 | Martini | 60—24 |
| 2,040,433 | 5/1936 | Duffaud | 417—560 |
| 2,910,119 | 10/1959 | Wennerberg | 417—209 X |
| 3,087,438 | 4/1963 | Ciesielski | 417—207 |
| 3,170,406 | 2/1965 | Robertson | 417—380 |
| 3,285,001 | 11/1966 | Turnblade | 417—208 |

WILLIAM L. FREEH, Primary Examiner

G. P. LAPOINTE, Assistant Examiner

U.S. Cl. X.R.

417—379, 392

UNITED STATES PATENT OFFICE

CERTIFICATE OF CORRECTION

Patent No. Re. 27,740 Dated August 21, 1973

Inventor(s) Mark Schuman

It is certified that error appears in the above-identified patent and that said Letters Patent are hereby corrected as shown below:

IN THE SPECIFICATION:

Column 5, line 12, change "outlet" to --outset--;

line 65, change "farmed" to --warmed--.

IN THE CLAIMS:

Claim 30, line 1 of the claim, change "28" to --29--.

Signed and Sealed this

*first* Day of *June 1976*

[SEAL]

*Attest:*

RUTH C. MASON
*Attesting Officer*

C. MARSHALL DANN
*Commissioner of Patents and Trademarks*